July 29, 1969    E. G. KRAMER    3,458,324
METHOD AND APPARATUS FOR SHROUDING AN ANIMAL CARCASS
Filed June 29, 1965    2 Sheets-Sheet 2

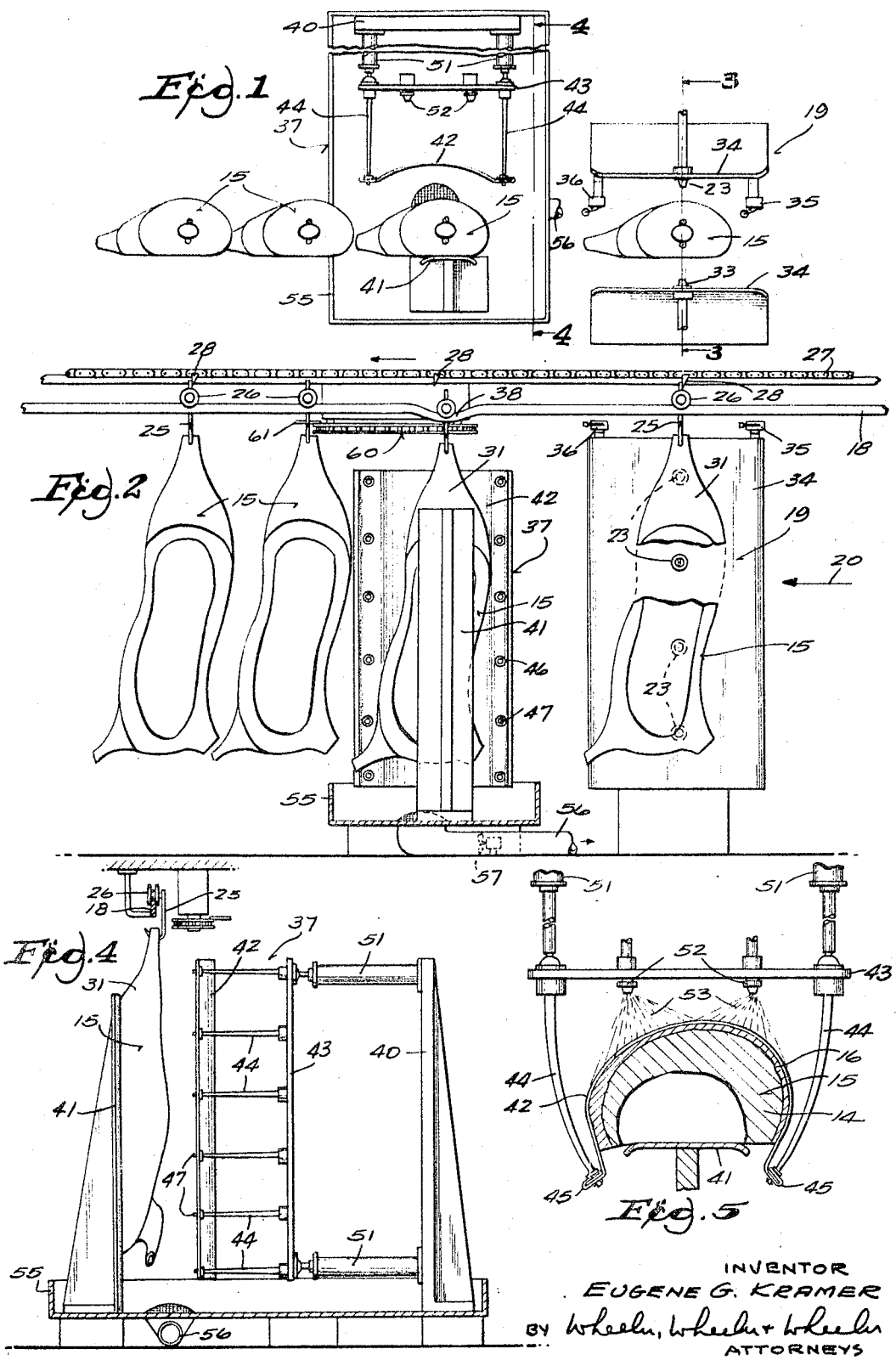

INVENTOR
EUGENE G. KRAMER
BY Wheeler, Wheeler + Wheeler
ATTORNEYS

United States Patent Office 3,458,324
Patented July 29, 1969

3,458,324
METHOD AND APPARATUS FOR SHROUDING AN ANIMAL CARCASS
Eugene G. Kramer, 530 Maplewood Court, Dubuque, Iowa 52001
Filed June 29, 1965, Ser. No. 467,978
Int. Cl. A22b 5/00; F25d 3/00
U.S. Cl. 99—194
7 Claims

ABSTRACT OF THE DISCLOSURE

This disclosure relates to shrouding a freshly killed, dehided animal carcass by momentarily exposing the outside fat layer thereof to extreme cold to irreversibly set up a thin external stratum in said fat layer.

---

This invention relates to a method and apparatus for shrouding an animal carcass.

Heretofore, a freshly killed, dehided animal carcass, such as a beef side, is shrouded by physically wrapping it in a fabric covering prior to transferring the carcass into a cooler. The fabric cover or shroud holds the jelly-like fat layer of the carcass against sloughing-off and protects the fat layer from injury caused by one carcass bumping against another. As the carcass cools in the cooler, the fat will ultimately set up and congeal to a firm consistency so that after 12 to 18 hours in the cooler, the fabric covering or shroud can be removed and the carcass can be further handled without danger of the fat layer sloughing-off or becoming dislocated.

In a typical slaughterhouse in which several hundred animals are slaughtered every day, the prior art techniques just described entails a heavy requirement for fabric covers and for the stainless steel pins by which the covers are attached to the carcass. Typically, 25 or 30 pins are required for each carcass. Moreover, the fabric covers must be laundered before re-use. This imposes a substantial laundry burden on the slaughterhouse.

Much hand labor is also required to "shroud" the carcass with the fabric covers. This is an unpleasant, messy task and presents a labor recruiting problems.

In accordance with the present invention, the fabric coverings, the steel pins and the hand labor are all eliminated. There is no longer a shroud laundry problem. Working conditions are improved.

In accordance with the present invention, the carcass is automatically shrouded by momentarily exposing the fat layer of the freshly killed, dehided animal carcass to extreme cold. This immediately sets up and congeals a thin stratum of the fat layer of the carcass. This stratum provides a natural shroud for the carcass. The carcass may thereafter be handled with no further mechanical or physical protective covering.

In practice, I use liquid carbon dioxide or liquid nitrogen as the coolant. This is at about −110° F. I spray this against a plastic barrier sheet which is pressed into intimate contact with the fat layer of the carcass. The fat layer is exposed to the coolant for only about three seconds. This is a sufficient exposure to drop the temperature of a thin external stratum of the fat layer of the carcass to the point where it sets up and congeals instantly. Thereafter, the carcass is sent to the cooler to remove body heat therefrom. Even though the internal body heat of the carcass will quickly elevate the temperature of the set up fat stratum, this does not reverse the setting up or congealing process aforesaid. The external fat stratum remains firm, and the natural shroud thus provided continues to be effective during the remaining steps in the processing of the carcass.

The novel apparatus to perform the method of this invention is quite automatic in operation and is integrated into the animal-like conveyor line so that the carcasses are shrouded in time with other animal-kill operations with no loss in time.

The apparatus of the present invention is more compact than is the space heretofore required for hand shrouding with fabric covers, etc., with greatly improved results and marked reduction in over-all cost.

Other objects, features and advantages of the invention will appear from the following disclosure in which:

FIG. 1 is a plan view diagrammatically showing apparatus for the practice of the present invention.

FIG. 2 is a side elevation of the apparatus shown in in FIG. 1.

FIG. 4 is a cross section taken along the line 4—4 of FIG. 1.

FIG. 5 is a horizontal cross section taken through the shrouding apparatus after the plastic barrier sheet has been partially wrapped arount the carcass.

Although the disclosure hereof is detailed and exact to enable those skilled in the art to practice the invention the physical embodiments herein disclosed merely exemplify the invention which may be embodied in other specific structure. The scope of the invention is defined in the claims appended hereto.

Figure 10:
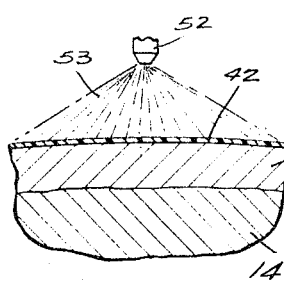
FIG. 10 is a view similar to that shown in FIG. 9, but in which the sheet barrier has been pressed against the fat layer and the coolant is in process of being sprayed thereagainst.
Figure 11:
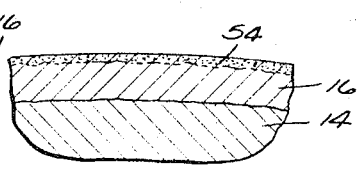
FIG. 11 is a similar view with the sheet barrier withdrawn and showing the set up and congealed external stratum of the fat layer.

The animal carcass 15 is represented in the instant drawings as a beef side from a freshly killed, dehided steer or the like. The hide has been stripped off of the carcass, thus leaving a jelly-like fat layer 16 (FIGS. 9–11) which will vary in thickness, depending upon its location on the carcass, etc. Fat layer 16 overlies the body flesh 14. The fat layer 16 may be as thick as two or three inches at certain parts of the carcass, and will taper down to nothing at other parts of the carcass. We are concerned only with the fat layer on the outside of the carcass.

The fat layer 16, while reasonably firm is somewhat jelly-like while the carcass is warm. The fat layer is interlaced with connective fiber which tends to hold it in place, even when the carcass is at animal body temperature, approximately 100° F. However, its jelly-like nature makes it somewhata flowable. Unless shrouded, the fat layer will tend to slough-off during handling, and particularly if one carcass is abraded or bumped against another.

Figure 9:
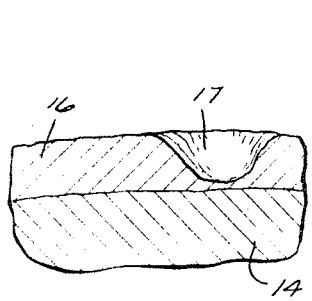
FIG. 9 is a greatly enlarged fragmentary cross section through an animal carcass showing the relationship between the fat layer and the body flesh of the animal.

FIG. 9 illustrates a common occurrence in which the fat layer 16 will have one or more pock marks or cavities 17. This typically occurs when the animal has been attacked by flies and fly eggs laid beneath the animal hide in the fat layer. These develop into grubs which grow in the fat layer. After the animal is dehided, packing house workers will gouge out the grubs to eliminate them from the fat layer, and this will produce pockets such as 17 in the fat layer 16. In the prior art fabric covering shrouding operation, the pressure of the fabric cover will cause localized flow of the jelly-fat to fill in the pockets 17 so that the final meat product will not be thus disfigured. It is also common practice in the prior art to apply a brine solution to the fat layer to function as a bleach to remove unwanted discolorations from the fat layer. This is typically applied by soaking the fabric covers in brine prior to pinning them to the carcass.

In accordance with the present invention, the carcass 15 is conveyed along the beef-kill line conveyor track 18 in the direction of arrow 20. It will first be passed through a brine spray station 19.

The brine spray station 19 is provided with a series of vertically spaced spray nozzles 23, at the fat layer side of the carcass. These are desirably of the type which produce a fan-shaped spray 24 by which the entire fat layer 16 of the carcass 15 is drenched with brine spray as the carcass moves continuously on the conveyor 18.

Each carcass 15 is hung on a hook 25 having a roller 26 which travels along the track 18. Propelling force is provided by the chain 27 which has lugs 28 spaced therealong to engage the hooks 25. The "round" 31 of the carcass 15 also has a fat layer thereover, and this is exposed to brine spray 32 from nozzle 33 at the opposite side of station 19 from nozzles 23.

The station 19 is desirably provided with spray confining baffle plates 34 between which the carcass passes. The spray nozzles 23, 33 may be controlled by entrance and exit limit switches 35, 36 which are actuated by the hook 25 as the carcass passes through the station 19. Alternatively, the brine spray may be operated continuously, and recirculated, if desired.

After leaving the brine spray station 19, the carcass 15 is treated at the shrouding station or apparatus 37. The conveyor track 18 has a dip at 38 (FIG. 2) where the carcass is left to dwell as the chain lug 28 passes thereover.

Figure 7:
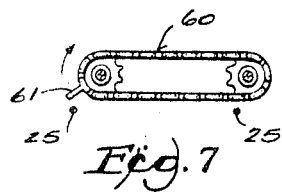
FIG. 7 is a plan view of the conveyor which controls the movement of the carcass through the shrouding apparatus.
Figure 6:
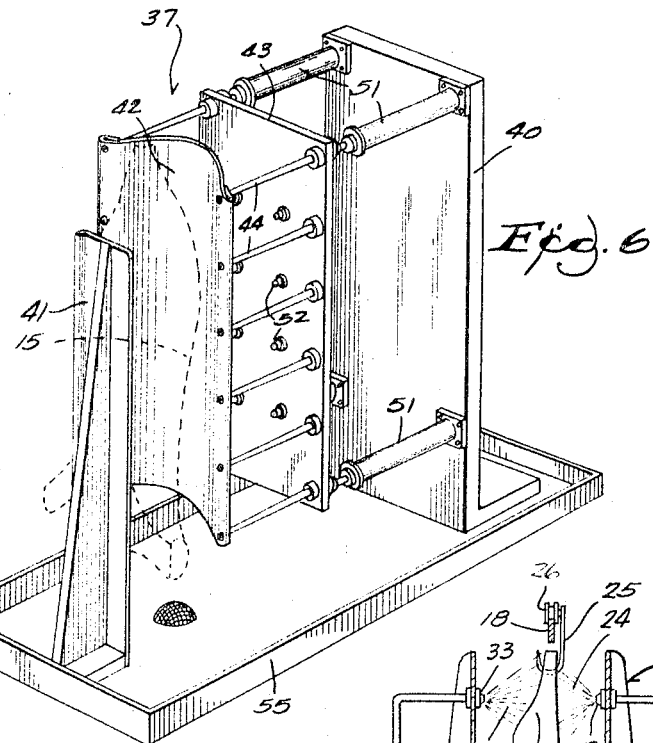
FIG. 6 is a perspective view of the shrouding apparatus.
Figure 8:
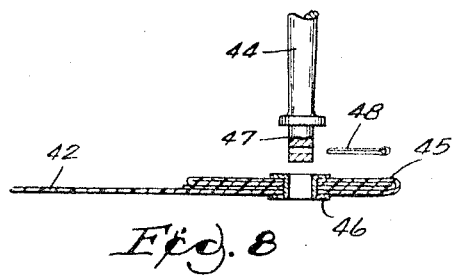
FIG. 8 is a fragmentary spaced apart enlarged view of the connection of the flexible posts in the shrouding apparatus with grommets in the margins of the sheet barrier.
Figure 3:
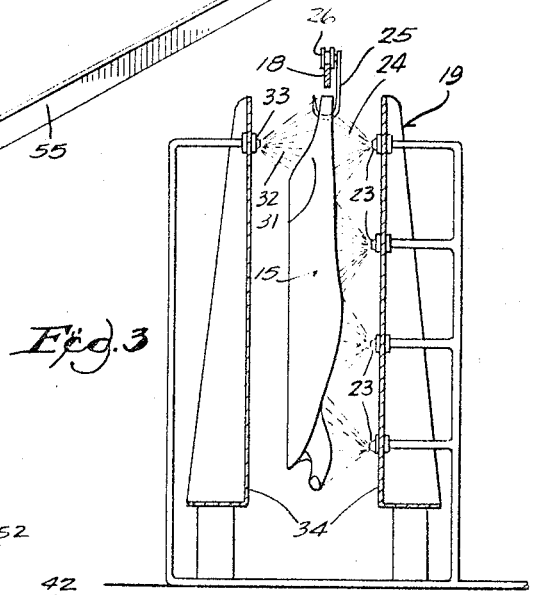
FIG. 3 is a cross section taken along the line 3—3 of FIG. 1.

Shrouding station 37 has a fixed backup plate 41 which is disposed to align with the inside of the carcass 15. The fat layer 16 at the other side of the carcass faces a plastic sheet barrier 42 which is mounted on a carriage plate or board 43 by a series of flexible rods 44. The plastic sheet barrier 42 is made of a suitable durable material such as polyethylene sheeting. In practice, I have used a sheeting which is .008 of an inch thick. As shown in FIG. 8, its margins are folded over several times at 45 to provide a thickened strip along its vertical edges. In alignment with each flexible rod 44, the margin strip 45 is provided with reinforcing grommets 46. The ends of rods 44 are provided with tongues 47 which extend through the grommets 46 and are releasably coupled thereto by such means as cotter pin 48.

The top and bottom edges of the sheet barrier 42 may also be folded into a hem which is cemented and stitched for reinforcement purposes.

The carriage board 43, upon which the rods 44 are mounted, is movably supported from a mast bracket 40 by corner fluid cylinders or motors 51, by which the carriage 43 and the sheet barrier 42 carried thereon may be selectively advanced and retracted with respect to the carcass 15. As the carcass 15 moves into the shrouding station 37, the sheet barrier carriage 43 is retracted on its fluid cylinders 51, as shown in FIG. 4. As soon as the carcass has reached its midposition, as shown in FIG. 2, a suitable limit switch (not shown) will be engaged to actuate the fluid cylinders 51 and to advance the carriage 43 to its position shown in FIG. 5, in which the sheet barrier 42 is at least partially wrapped around the carcass 15.

The flexible rods 44 will yield inwardly toward one another, as shown in FIG. 5, as the plastic sheet 42 stretches around the carcass 15. Accordingly, considerable mechanical pressure is imposed on the fat layer 16, thus to cause such limited flow of fat as is desirable to fill in and smooth out the pockets 17, as aforestated.

The carriage 43 will move in until the plastic sheet 42 is snug and in intimate contact with fat layer 16. Another limit switch (not shown) will then be actuated to initiate spray of coolant such as liquid nitrogen or liquid carbon dioxide through the spray nozzles 52 and against the sheet 42. Nozzles 52 are disposed on carriage board 43 in a pattern pursuant to which the liquid spray 53 from the nozzles 52 will reach all parts of the plastic sheet 42 in contact with the fat layer 16 of the carcass 15.

If liquid carbon dioxide is sprayed, for example, it will immediately expand into a crystalline state called "snow," which will adhere to the sheet barrier 42. The sheet barrier 42 will thus be exposed to extreme cold at the approximate temperature of $-110°$ F. The exact temperature will, of course, vary depending on the coolant used. By "extreme cold" as used herein, I mean such a temperature (as $-110°$ F.) which is greatly below that normally produced in walk-in coolers aforementioned. This extreme cold will be transferred immediately through the thin polyethylene sheet 42 to set up and congeal a thin external stratum 54 of the fat layer 16 in contact with the sheet 42. Stratum 54, as shown in in FIG. 11, will be very thin, of the order of $\frac{1}{32}$ of an inch deep. The fat in stratum 54 will drop to a temperature close to that of the coolant, for example, about $-65°$ F., while it is exposed to the cold transmitted through the sheet barrier 42.

A timer (not shown) controls the spray nozzles 52 so that the exposure of the fat layer to the cold is very short in duration, desirably about three seconds, whereupon coolant spraying through the nozzles 52 will be discontinued. Thereupon the fluid motors 51 will be reversed to withdraw the carriage 43 and the sheet 42 from against the carcass.

Neither the time duration of exposure per se nor temperature per se is critical, except that enough heat must be extracted from stratum 54 to produce an irreversible set up of the fat therein.

The expanded carbon dioxide or other coolant adherent to the sheet 42 may sublimate directly into the atmosphere or may fall by gravity into a tray 55 at the bottom of the station 37. A ventilator exhaust duct 56 with fan 57 is provided to remove sublimated carbon dioxide gas from the vicinity of the shrouding apparatus.

The fat layer 16 of the carcass 15 has now been shrouded with a stratum 54 of fat which has set up and congealed. This stratum will protect the fat layer 16 and prevent sloughing-off and abrasion damage as aforestated.

The carcass 15 is now moved out of the station 37 by a secondary chain conveyor 60 which has a single tooth 61 which is timed to remove the carcass 15 from station 37 after the carcass has dwelt therewithin for about ten seconds. Conveyor 60 moves the roller 26 for the hook 25 which supports the carcass out of the track dip 38 and onto the conveying level of track 18 and into range of the lugs 28 on chain 27, whereupon the hook 25 will be engaged by one of the lugs 28 on chain 27 to be moved further in the direction of arrow 20, and into a cooler room in which animal heat will be removed from the carcass over a period of about 12 to 18 hours.

The shroud stratum 54 will rise in temperature to about 90° F. shortly after removal of the carcass from shrouding station 37. However, the setting up process by which the fat in stratum 54 was made firm by cooling does not reverse, even upon such increase in its temperature, and the fat stratum 54 continues to function thereafter as a natural protective shroud.

The plastic barrier sheet 42 is used repeatedly. In normal use it will last during the shrouding of about one thousand carcasses before it becomes torn, or the like. It is simply and easily removed from the rods 44 on the releasable coupling, shown in FIG. 8, and a new sheet readily substituted therefor.

Because of the absence of any fabric cover, body heat in the carcass will drop more rapidly in the cooler than heretofore, thus speeding the cooling process. The carcass will have a more uniform and smooth fat covering 16 than was heretofore achieved by hand shrouding with fabric cloths. These superior results are achieved at greatly reduced cost, elimination of hand labor and improvement of working conditions in the slaughterhouse.

I claim:

1. A method of shrouding a freshly killed dehided animal carcass by wrapping a sheet barrier at least partially about the carcass, tightening said sheet barrier about said carcass whereby the sheet barrier is in intimate contact with the outer fat layer of the carcass causing a localized flow in the fat layers to fill in any irregularities in said fat layer, and momentarily exposing said outer fat layer with the sheet barrier thereon to extreme cold to irreversibly set up a thin external stratum in said outer fat layer.

2. The invention of claim 1 in which the cold is applied in the form of a liquid coolant sprayed against the sheet barrier.

3. A process for treating a freshly killed, dehided animal carcass comprising the steps of:
   applying brine to the outer fat layer of the carcass,
   pressing a sheet barrier against the outer fat layer of the carcass to cause a localized flow in said fat layer to fill in any irregularities in said fat layer,
   momentarily applying extreme cold to the fat layer through the sheet barrier to irreversibly set up a thin stratum of the fat in contact with the sheet barrier,
   removing the sheet barrier from contact with the fat layer,
   transferring the carcass to a cooler.

4. Apparatus for shrouding a freshly killed, dehided animal carcass comprising:
   a sheet barrier,
   first means for pressing the sheet barrier and the outer fat layer of the carcass into intimate contact to cause a localized flow in said fat layer to fill in any irregularities in said fat layer,
   second means for momentarily applying extreme cold to the sheet barrier to set up a thin stratum of the fat in contact therewith.

5. The apparatus of claim 4 in which said second means comprises means for spraying the cold in the form of a liquid coolant against said sheet barrier.

6. The device of claim 4 in which the means for pressing the sheet barrier against the carcass comprises a series of flexible rods to which the sheet barrier is marginally connected, said rods being adapted to yield as the sheet barrier is pressed against the carcass to at least partially wrap the sheet barrier about the carcass.

7. Apparatus for processing a freshly killed, dehided animal carcass comprising:
   a conveyor mechanism for advancing the carcass,
   means at one point along the conveyor for applying brine to the outer fat layer of the carcass,
   means farther along the conveyor for pressing a sheet barrier against the outer fat layer of the carcass to cause a localized flow in said fat layer to fill in any irregularities in said fat layer,
   means for momentarily applying extreme cold to the sheet barrier to set up a thin stratum of the fat in contact therewith, and
   means for transferring the carcass on said conveyor to a cooler.

References Cited

UNITED STATES PATENTS

| | | | |
|---|---|---|---|
| 1,465,028 | 8/1923 | Stacey | 99—194 X |
| 1,873,130 | 8/1932 | Jones et al. | 62—62 |
| 1,952,666 | 3/1934 | Foss | 62—62 |
| 2,065,358 | 12/1936 | Zarotschenzeff. | |
| 2,993,346 | 7/1961 | Mills. | |
| 3,007,319 | 11/1961 | Ogden. | |

HYMAN LORD, Primary Examiner

U.S. Cl. X.R.

62—62, 341, 374